UNITED STATES PATENT OFFICE.

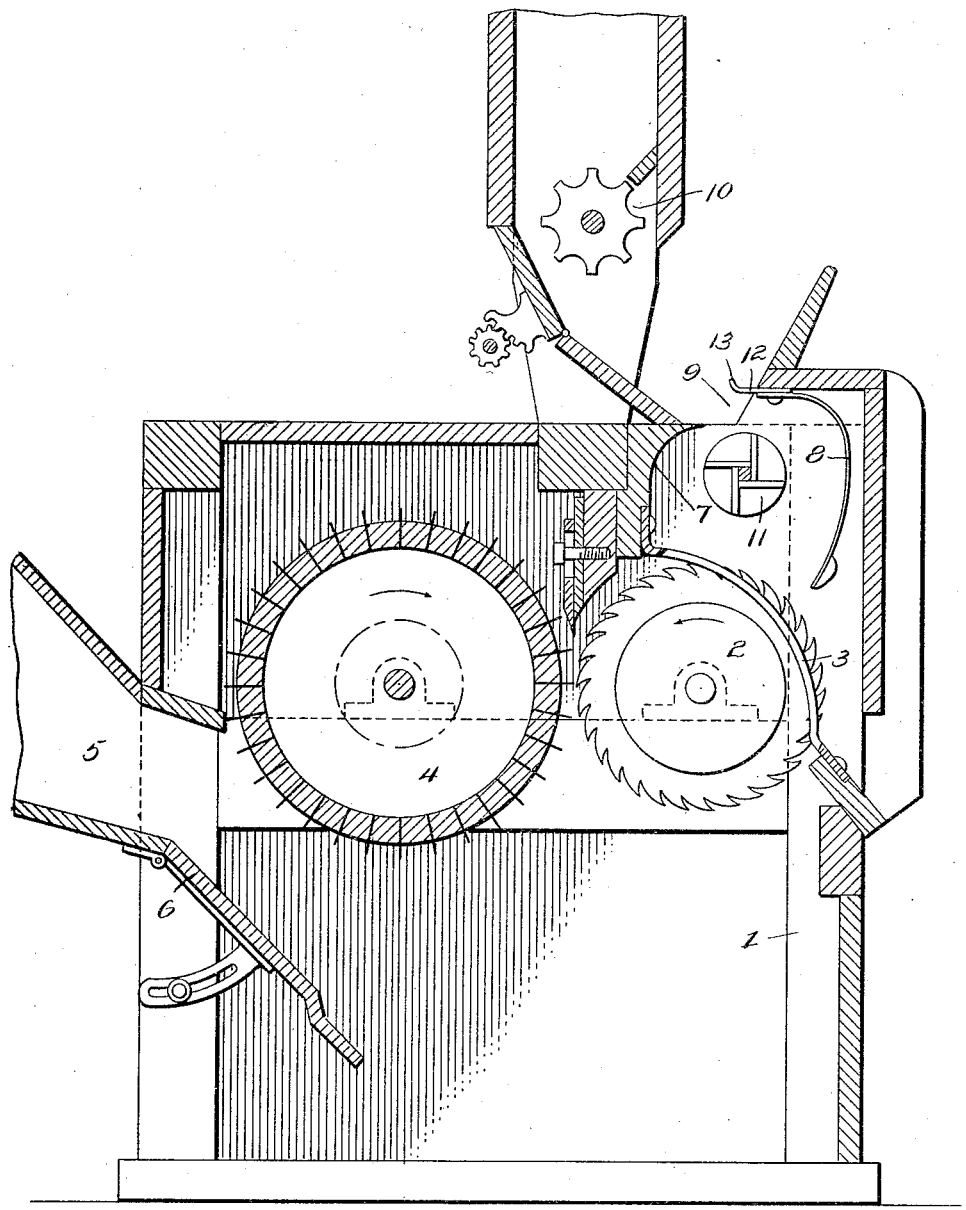

FREDERICK AUGUSTUS HOEFER, OF COLUMBIA, SOUTH CAROLINA, ASSIGNOR TO HUGH E. SESSIONS, OF COLUMBIA, SOUTH CAROLINA.

COTTON-SEED LINTER.

1,114,475.

Specification of Letters Patent.

Patented Oct. 20, 1914.

Application filed August 29, 1912. Serial No. 717,801.

*To all whom it may concern:*

Be it known that I, FREDERICK AUGUSTUS HOEFER, a citizen of the United States, residing at Columbia, Richland county, State of South Carolina, have invented certain new and useful Improvements in Cotton-Seed Linters, of which the following is a specification.

This invention relates to the class of machines described in the patent to H. E. Sessions No. 962,722, granted June 28, 1910 and has particular reference to the means for presenting the seed to the saw cylinder for the purpose of removing the lint. It has been my purpose to secure a more even movement of the seed in the roll above the saws and to avoid choking and the consequent friction and resistance to movement.

The novel features will be apparent from the following description taken in connection with the drawings.

In the drawing I have shown a vertical transverse section of a machine having my invention applied thereto.

As will be understood by those skilled in the art the purpose of the machine is to remove the fine lint which is on the cotton seed after they have passed through the ordinary gin and the machine itself includes as its essential elements a casing 1, in which there is mounted a saw cylinder 2 which has on it a gang of saws passing between the ribs 3 into the space where the seed are fed. A brush cylinder 4 is mounted at the rear of the saw cylinder and brushes the lint from the saw teeth down into the chamber beneath and this brush cylinder by its motion creates a draft out through the discharge flue 5, the fine lint passing up over the mold board 6, which is preferably arranged as described in the above mentioned patent to Sessions.

Above the saw cylinder there is a casing formed by the rear curved wall 7 and the front curved wall 8, these walls terminating at the top at such points that there is an inlet opening 9 left for the admission of seed fed down by the feeding mechanism 10. An agitator 11 is placed longitudinally within the said casing and it is provided with wings and rotates in such a way as to turn the roll of seed in the chamber in the same direction that the saws tend to turn it.

The features of the machine so far described do not constitute my invention, but I have found that with the parts so arranged the roll of seed carried around by the agitator 11 and the saws will bank up in front of the upper end of the front wall 8 forming a ridge and that this interferes with the free operation of the machine, causing friction and resistance and preventing the seed from being properly fed to the saw teeth extending through the ridge 3. It will be observed that in the form shown the front wall terminates at a point higher than the termination of the rear wall and the seed are fed in from the rear at this point. I have found that by placing a narrow board 12 along the end of the front wall 8 and constituting a horizontal extension thereof will very materially improve the action of the device. I preferably incline the rear edge 13 of this board upward since this incline or rounded edge makes the seed pass under the board more easily. It will further be observed from the drawing that this board 12 extends out approximately above the center of the agitator 11, or in other words, to the center of the roll of seed which is turned by that agitator. I find that this arrangement serves to prevent the banking up of the seed in front of the front wall and makes them pass in smoothly and without friction, thus causing them to be properly presented to the saw teeth without unnecessary exercise of force. This board 12 can be applied to many linters now on the market without reconstructing those machines or making any other material change in the structure. I find that by the use of this invention a materially greater amount of seed can be delinted by the machine within any given time without requiring any more power to run the machine.

Having thus described the invention what I claim as new is:

1. In a cotton seed linter, the combination with a gang of saws, of ribs between which they work, a casing having curved walls above said saw cylinder to retain a roll of seed above and in contact with said saws and ribs, the said walls being separated at the top to have an inlet opening and the front wall terminating at a higher level than the rear wall, a flat board extending rearward from the edge of the front wall substantially as far as the center line of said roll of seed and having an upwardly turned rear edge, and a central rotary agitator in said casing extending longitudinally of said roll to turn the same.

2. In a cotton seed linter, the combination with a gang of saws, of ribs between which they work, a casing having curved walls above said saw cylinder to retain a roll of seed above and in contact with said saws and ribs, the said walls being separated at the top to have an inlet opening and the front wall terminating in a horizontal portion at a higher level than the end of the rear wall, the said horizontal portion extending rearward substantially to the center line of said roll of seed and having an upwardly rounded edge, and a central rotary agitator in said casing extending longitudinally of said roll to turn the same.

3. In a cotton seed linter, the combination with a gang of saws, of ribs between which they work, a casing having curved walls above said saw cylinder to retain a roll of seed above and in contact with said saws and ribs, the said walls being separated at the top to have an inlet opening, the rear wall terminating at a point behind the center line of the roll and the front wall terminating in a horizontal board extending rearward as far as the center line of said roll, a space being left for the entrance of seed between the ends of said walls, and a central rotary agitator within said casing for turning said roll.

In testimony whereof I affix my signature in presence of two witnesses.

FREDERICK AUGUSTUS HOEFER.

Witnesses:
J. W. LEVER,
T. D. WRAY.

Copies of this patent may be obtained for five cents each, by addressing the "Commissioner of Patents, Washington, D. C."